United States Patent
Kirsch

(10) Patent No.: US 12,447,785 B2
(45) Date of Patent: Oct. 21, 2025

(54) CHASSIS COMPONENT FOR A VEHICLE WITH A HOLLOW METAL BASE BODY AND METHOD OF MANUFACTURING SUCH A CHASSIS COMPONENT

(71) Applicant: ZF Friedrichshafen AG, Friedrichshafen (DE)

(72) Inventor: Gordon Kirsch, Kirchhundem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/403,152

(22) Filed: Jan. 3, 2024

(65) Prior Publication Data
US 2024/0217290 A1 Jul. 4, 2024

(30) Foreign Application Priority Data
Jan. 4, 2023 (DE) ............. 10 2023 200 057.1

(51) Int. Cl.
*B60G 7/00* (2006.01)

(52) U.S. Cl.
CPC ............ *B60G 7/005* (2013.01); *B60G 7/001* (2013.01); *B60G 2204/416* (2013.01)

(58) Field of Classification Search
CPC ... B60G 7/005; B60G 7/001; B60G 2204/416
See application file for complete search history.

(56) References Cited

U.S. PATENT DOCUMENTS

| | | | |
|---|---|---|---|
| 5,009,538 A * | 4/1991 | Shirai | F16C 11/0657 403/140 |
| 5,213,008 A * | 5/1993 | Kanno | F16C 11/0685 403/267 |
| 5,615,967 A * | 4/1997 | Hellon | B29C 45/14336 403/56 |
| 5,947,627 A * | 9/1999 | Uneme | F16C 11/0657 403/130 |
| 7,017,224 B2 * | 3/2006 | Buchanan, Jr. | F16C 7/04 15/250.31 |
| 2015/0280526 A1 | 10/2015 | Chamberlin et al. | |

(Continued)

FOREIGN PATENT DOCUMENTS

| | | |
|---|---|---|
| DE | 100 63 928 A1 | 4/2002 |
| DE | 10 2010 041 791 A1 | 4/2012 |
| DE | 10 2012 019 749 A1 | 4/2014 |

OTHER PUBLICATIONS

German Patent Office, Office Action issued in German patent application No. 10 2023 200 057.1 (Aug. 28, 2023).

*Primary Examiner* — Paul N Dickson
(74) *Attorney, Agent, or Firm* — Finch & Maloney PLLC

(57) ABSTRACT

A chassis component for a vehicle has a hollow metallic base body, where at least one axial end section of the base body is deformed in order to seal the base body, and having at least one joint housing made of plastic. The joint housing is injection-molded and/or cast onto the end section of the base body. In order to produce in a simple manner a sufficient interlock between the plastic of the joint housing and the end section, an outer side of the end section has a number of ridges and depressions such that by means of the ridges and depressions an interlock can be formed with the plastic of the joint housing.

17 Claims, 7 Drawing Sheets

(56) References Cited

U.S. PATENT DOCUMENTS

| | | | |
|---|---|---|---|
| 2016/0003290 A1* | 1/2016 | Trotter | F16C 7/06 |
| | | | 403/56 |
| 2016/0003292 A1* | 1/2016 | Trotter | B60G 7/001 |
| | | | 403/134 |
| 2017/0313154 A1* | 11/2017 | Kuroda | B60G 7/005 |
| 2018/0297439 A1 | 10/2018 | Meabe Zabala et al. | |

* cited by examiner

CHASSIS COMPONENT FOR A VEHICLE WITH A HOLLOW METAL BASE BODY AND METHOD OF MANUFACTURING SUCH A CHASSIS COMPONENT

RELATED APPLICATIONS

This application claims the benefit of and right of priority under 35 U.S.C. § 119 to German Patent Application no. 10 2023 200 057.1, filed on 4 Jan. 2023, the contents of which are incorporated herein by reference in its entirety.

FIELD OF THE DISCLOSURE

The invention relates to a chassis component for a vehicle, with a hollow metallic base body such that at least one axial end section of the base body is deformed so as to seal the base body, and with at least one joint housing made of plastic, such that the joint housing is injection-molded and/or cast onto the end section of the base body. In addition, the invention relates to a method for producing such a chassis component, wherein the axial end section of the hollow metallic base body is deformed in order to seal the base body, and the at least one joint housing made of plastic is injection-molded and/or cast onto the deformed end section of the base body.

BACKGROUND

Such a chassis component and such a method are known from DE 100 63 928 A1. In that case the end section of the tubular base body is shaped to produce a flat profile in which, in addition, a through-going hole is made. By virtue of the hole, a sufficient interlock between the plastic of the joint housing and the end section can be realized.

However, the production of the hole entails additional cost and an additional work step. In addition, owing to the structure of the end section as a flat profile with a hole, the direction and/or orientation of the joint housing relative to the base body is predetermined. Accordingly, the base body with the deformed end section has to be orientated in a specified manner for forming the joint housing.

As an alternative to a tubular base body, from DE 10 2010 041 791 A1 the use of a bar as a base body is known, in the end section of which radially extending ridges and depressions that surround the outer circumference are formed. In that way there is no need to orientate the base body for the injection-molding of the joint housing. The disadvantage, however, is that the bar made of solid material weighs more compared with a tubular base body.

SUMMARY

The purpose of the present invention is to develop further a chassis component and/or a method of the type mentioned to begin with, in such a way that in a simple manner a sufficiently positive interlock between the plastic of the joint housing and the end section can be produced. In particular, a particular orientation of the end section in the circumferential direction of the base body about its central longitudinal axis and relative to the injection-molding of the joint housing should not be necessary. Preferably, an alternative embodiment should be provided.

The stated objective of the invention is achieved with a chassis component according to the present disclosure. Preferred further developments of the invention will be apparent from the present disclosure.

The chassis component is designed for a vehicle, in particular a motor vehicle. Preferably, the chassis component is designed for a chassis of the vehicle and/or the chassis component is incorporated in the chassis of the vehicle. The chassis component can be, for example, a pendulum support, a chassis linkage, a two-point control arm, a transverse control arm, or a stabilizer bar. In particular, in a chassis, chassis components serve to articulate other chassis components to one another or to connect them to the vehicle body or to an axle carrier attached thereto.

The chassis component has a hollow base body made of metal. Preferably, the base body is pipe-like or tubular. The hollow or tubular base body can have a circular or oval cross-section. In particular the cross-section of the base body is closed so that a hollow space is formed inside the base body. Preferably, the base body is a metallic tube. By virtue of the hollow or tubular structure of the base body the weigh is reduced, especially compared with a bar of solid material.

In particular, the base body has two axial end sections. Preferably, the two end sections at the same time form two ends of the base body facing away from one another. At least one axial end section of the base body is deformed in order to close the base body, preferably forming a seal. In particular, owing to the plastic deformation the end section is no longer hollow or tubular. Furthermore, the chassis component comprises at least one joint housing made of plastic, this joint housing being injection-molded and/or cast onto the end section of the base body.

Owing to the deformation, in order to seal the base body, the outside of the end section has a plurality of ridges and depressions such that by means of the ridges and depressions an interlock is formed with the plastic of the joint housing, in particular for fixing and/or holding the joint housing onto the end section.

In this connection it is advantageous that the deformation of the end section for sealing the base body and the formation of the ridges and depressions on the outside of the end section take place at the same time and thus in the same working step. In that way the production process is optimized. Owing to the still hollow or tubular base body apart from the deformed end section, on the one hand a weight-optimized chassis component can be made and on the other hand, by virtue of the ridges and depressions, a sufficiently strong interlock between the end section and the joint housing can be produced. In particular, the joint housing has matching depressions and ridges that correspond with the ridges and depressions of the end section.

In particular, by virtue of the ridges and depressions the end section is profiled, so that thanks to the interlock the joint housing is secured against any unwanted displacement in the axial direction of the central longitudinal axis of the base body and also against any unwanted rotation about the central longitudinal axis. Preferably, the joint housing is profiled so that it fits into the profiling of the end section.

The joint housing can have a joint component that fits into the joint housing in an articulated manner. In particular the joint component comprises a joint ball and/or a joint pin. The joint component can be in the form of a ball pin or a ball sleeve. The joint housing and the joint component can constitute a ball joint. In particular, a ball joint consists of the joint housing open on at least one side with a housing recess, and a joint component fitted in the housing recess so that it can swivel and/or rotate relative to the joint housing. In that case the joint pin of the joint component can project outward from a housing aperture of the joint housing. Between the joint housing and a joint ball of the joint component a bearing shell can be arranged, which reduces the friction and thus also the wear of the joint despite its occasionally high operational loading.

According to a further development, the deformed end section forms a labyrinth-type seal by virtue of the plurality of ridges and depressions for closing the base body. In particular a hollow space and/or inside space of the base body is sealed against the penetration of plastic when the joint housing is formed, due to the deformed end section and/or the labyrinth seal. The labyrinth seal can be formed by the interlocking of the ridges and depressions of the end section. Preferably an aperture of the hollow or tubular base body, which would otherwise be open, is closed by the deformation of the end section. Owing to the deformation of its end section, the base body can be partially or completely sealed closed. The essential requirement here is that the base body is closed to the extent that when the plastic used to produce the joint housing is injection-molded and/or cast around it, no plastic penetrates into the base body or, for example, into a cylindrical hollow space of the joint housing. For example, a narrow gap remaining after the deformation, in particular due to manufacturing tolerances, may well pose no problems for the injection-molding and/or casting provided that the plastic does not penetrate completely through the gap and/or does not fill the hollow space of the base body.

In a further embodiment, a plurality of first ridges and a plurality of first depressions of the end section are formed in alteration in the axial direction of the base body. In particular, several rows distributed in the circumferential direction of the end section, each with first ridges and first depressions alternating one after another in the axial direction of the end section are formed. Preferably, the several rows are orientated in the axial direction of a central longitudinal axis of the base body, or parallel to the central longitudinal axis. For example, each row has two, three, or more first depressions and two, three, or more first ridges in alternation one after another. In particular, the several rows can be formed uniformly distributed in the circumferential direction around the end section. For example, the end section can have a total of at least three or more rows, for example six rows. Owing to the orientation of the rows, the joint housing can be secured against unwanted rotation about the central lox axis of the base body. The alternating arrangement of the first ridges and first depressions can also secure the joint housing against unwanted displacement of the joint housing in the axial direction of the central longitudinal axis.

According to a further development, at least one second ridge and at least one second depression are formed transversely or perpendicularly to the axial direction of the base body, alternating one after another. Thus, the end section can have a plurality of first and second depressions and ridges and a plurality of second depressions and ridges. In particular, the second ridge and/or the second depression are formed as part of a first ridge and/or a first depression. Thus, a single first ridge and/or a single first depression can respectively comprise at least one second ridge and/or at least one second depression. The second ridge and/or the second depression can form, for example, a head or a head contour of the first ridge.

In a further embodiment, the deformed end section is formed rotationally symmetrically relative to the central longitudinal axis of the base body. Thus, the end section and/or the base body with the deformed end section can be mapped upon itself for rotations about the central longitudinal axis with a specified rotation angle or rotation angles. Here it is advantageous that, owing to the rotationally symmetrical form, there is no need for a particular orientation of the end section in the circumferential direction of the base body about the central longitudinal axis and in relation to the injection-molding of the joint housing. In particular, the joint housings can be formed at two end sections of the base body remote from one another, rotated at any desired angle relative to one another and to the central longitudinal axis.

Preferably, the rotational symmetry of the deformed end sections relative to a rotation about the central longitudinal axis corresponds to a rotation angle smaller than 180° in each case. In particular, the rotational symmetry of the deformed end sections corresponds to a rotation angle of 120° or less in each case. For example, with a rotation angle of 120° the deformed end section can be mapped upon itself in a total of three positions. Preferably, the rotational symmetry of the end section corresponds to a rotation angle of 90° or less in each case. For example, with a rotation angle of 90° the deformed end section can be mapped upon itself in a total of four positions.

According to a further development, the end section has a plurality of, or at least three web-like folds which are formed, in particular, uniformly distributed in the circumferential direction of the base body and which extend parallel with and/or radially relative to the central longitudinal axis. Preferably, the folds are produced in the form of material folds of wall sections of the end section. In particular, each fold is in the form of a simple material fold. Thus, in each case a fold can consist of two material layers of the end section and/or wall sections of the end section pressed against one another. Preferably, sections of an inner side of the end section are in contact with one another to form a web-like fold in each case.

The ridges and depressions can be formed on outside sections, facing away from one another, of each web-like fold. In each case a web-like fold can comprise a first outside section and a second outside section facing away from the first outside section. Preferably, ridges and depressions are formed both on the first outside section and on the second outside section. In particular, as viewed in the axial direction of the base body relative to the central longitudinal axis, the position of first ridges on a first outside section correspond in each case of a web-like fold to the position of first depressions on a second outside section of the respective web-like fold facing away from the first outside section.

On its front end the deformed end section can form or comprise a closed end face in particular for sealing off the base body. This closed end face prevents the penetration of plastic during the formation of the joint housing. The end face can be flat or not flat. Preferably, the end face is cross-shaped or cruciform. The cross-shaped or cruciform end face can have three, four, or more limbs.

In particular, the deformed end section has at its end a hollow that is preferably directed axially inward relative to the central longitudinal axis of the base body. The hollow can be pot-shaped. In particular, the hollow is closed and directed radially inward for the sealing closure of the base body. The radially inwardly closed hollow is formed by virtue of the deformation of the end section. Preferably, the hollow is filled with plastic for forming the joint housing. By virtue of the hollow, the interlock between the end section and the plastic of the joint housing can be improved.

In a further embodiment, two axial end sections of the base body facing away from one another are deformed, in particular for the sealing closure of the base body. In this case, a joint housing made of plastic is injection-molded and/or cast on each of the two end sections. In particular, a joint component is fitted in the joint housing in an articulated manner. The chassis component can be designed as a chassis linkage or as a two-point control arm or as a pendulum support or as a transverse control arm or as a stabilizer bar.

Particularly advantageous is a method for producing a chassis component according to the invention. In this, the axial end section of the hollow or tubular metallic base body is deformed, in particular in order to close off and seal the base body. Then the plastic joint housing is injection-molded and/or cast onto the deformed end section. When deforming the end section, at the same time a plurality of ridges and depressions are made on the outside of the end section, so that when the joint housing is injection-molded and/or cast onto the end section, an interlock is formed between the plastic of the joint housing and the ridges and depressions.

According to a further embodiment of the method, in particular in order to close off and seal the base body, the end section is at least partially pressed in and/or folded from the outside inward and radially relative to the central longitudinal axis, by means of a pressing tool. Preferably, in particular for its plastic deformation, the end section is deformed and/or folded radially from the outside inward from at least three different directions. For that purpose, the pressing tool can comprise a number of pressing jaws or pressing rams, in particular three of them. In particular, the pressing tool, or its pressing jaws and/or pressing rams, have a pressing contour whose shape corresponds as a negative profile to the desired profile of the end section. Thus, the pressing tool or its pressing jaws or pressing rams can have a pressing contour with contoured ridges and contoured depressions that correspond respectively to the depressions and ridges of the deformed end section.

BRIEF DESCRIPTION OF THE DRAWINGS

Below, the invention is explained in greater detail with reference to the attached figures, in which the same indexes denote the same, similar, or functionally equivalent components, and which show.

DETAILED DESCRIPTION

Figure 1:
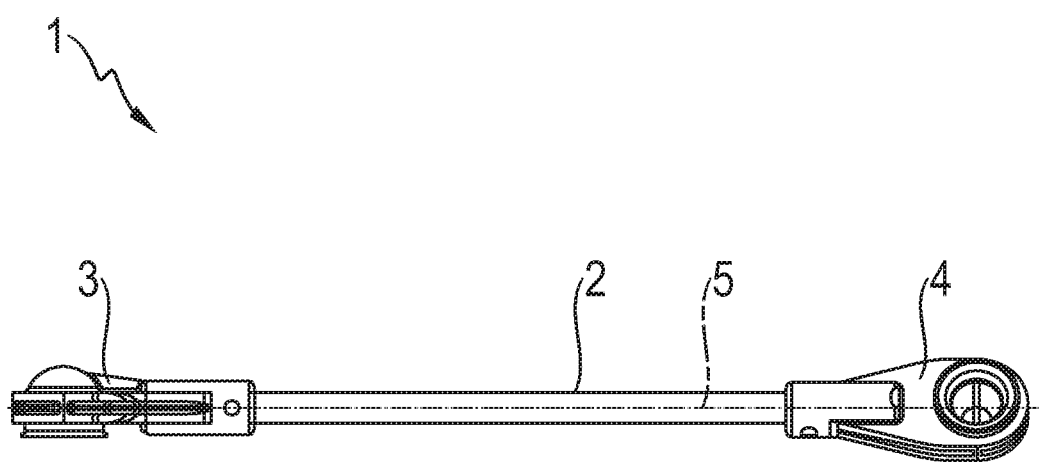
FIG. 1: A side view of a chassis component according to the invention.

FIG. 1 shows a side view of a chassis component 1 according to the invention. The chassis component 1 has a hollow base body 2 made of metal, which body in this example embodiment is straight. In this case the base body 2 is hollow because its structure is tubular. At the two axial ends of the base body 2 remote from one another, in each case is arranged a joint housing 3 made of plastic. The base body 2 or the chassis component 1 has a central longitudinal axis 5. In this example embodiment the chassis component 1 is in the form of a pendulum support for a chassis of a vehicle (no more of which is shown here). Furthermore, in this case, for example, the two joint housings 3 are rotated relative to one another by a specified angle and fixed on the base body relative to the central longitudinal axis.

Figure 2:
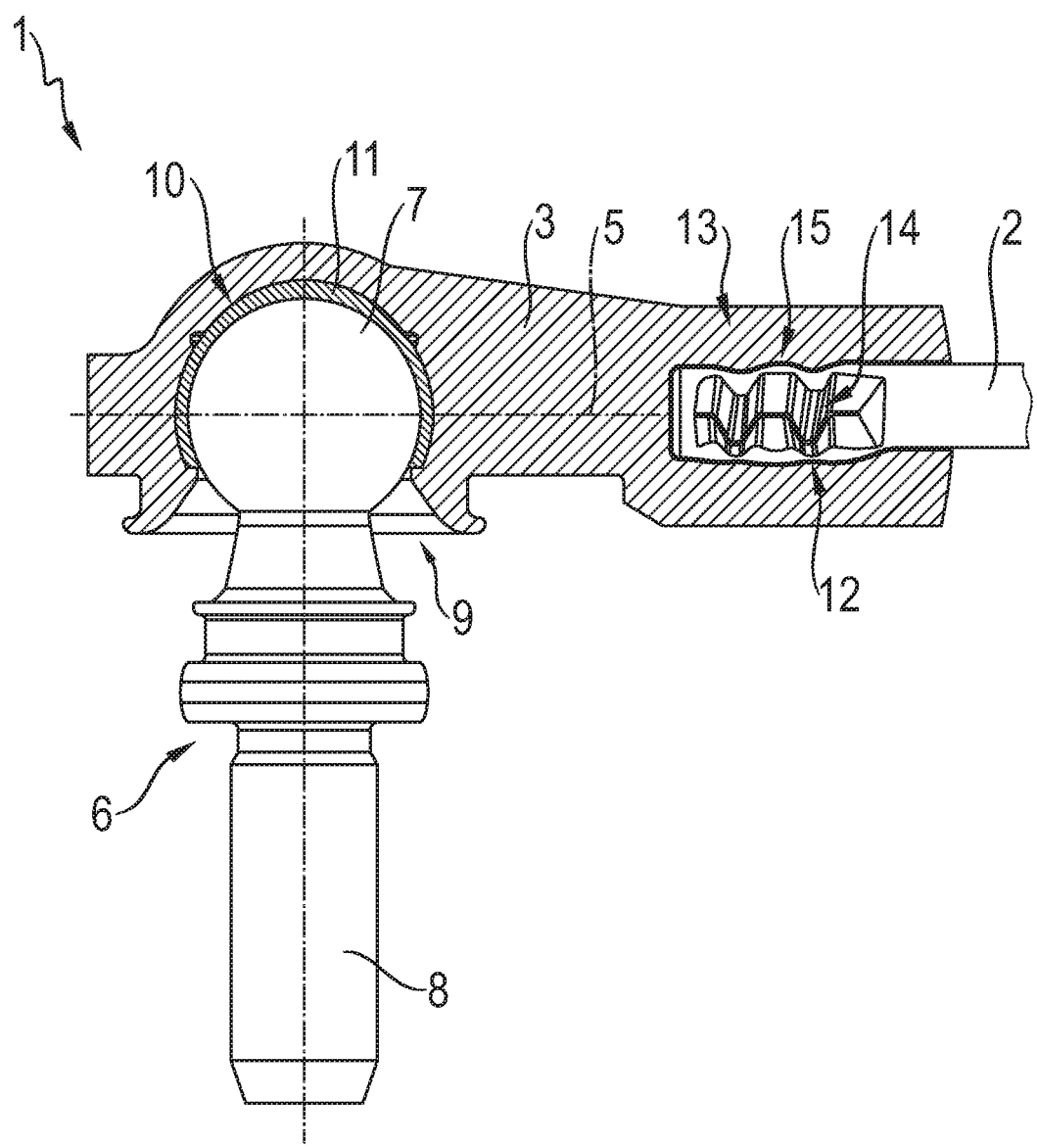
FIG. 2: Part of a partially sectioned side view of the chassis component according to the invention shown in FIG. 1, FIG. 3: Part of a side view of a base body of the chassis component according to the invention shown in FIGS. 1 and 2, FIG. 4: Part of a further side view of the base body shown in FIG. 3, FIG. 5: Part of a perspective view of the base body shown in FIGS. 3 and 4, FIG. 6: A front view of the base body shown in FIGS. 3 to 5, and FIG. 7: Part of a perspective view of a further base body for a chassis component according to the invention.

FIG. 2 shows part of a partially sectioned side view of the chassis component 1 in FIG. 1. The joint housing 3 is shown in cross-section. Other than in FIG. 1, in this case the joint housing 3 is shown with a joint component 6. The joint component 6 is fitted in the joint housing 3 in an articulated manner. In this example embodiment, the joint component 6 is in the form of a ball pin and comprises a joint ball 7 and a joint pin 8. Thus, the joint housing 3 and the joint component 6 form a ball joint. In this example embodiment the joint housing 3 is made open on one side with a housing aperture 9. The joint component 7 or joint ball 7 is fitted into a housing recess 10 of the joint housing 3. Moreover, in this example embodiment a bearing shell 11 is arranged between the joint housing 3 and the joint ball 7, i.e., in the housing recess 10. The bearing shell 11 is made of a friction-reducing plastic and is held positionally fixed in the housing recess 10. The joint component 6 is fitted with its joint ball 7 inside the housing recess 10 and the bearing shell 11, in such manner that it can swivel and/or rotate relative to the joint housing 3. In this case the joint pin 8 extends, starting from the joint ball 7, through the housing aperture 9 and out of the joint housing 3.

The base body 2 has a plastically deformed end section 12. The end section 12 is accommodated in a connection area 13 of the joint housing 3. The end section 12 has a profile 14 which cooperates with a counter-profile 15 of corresponding shape in the joint housing 3. Thus, the end section 12 is accommodated and held with interlock in the joint housing 3 or the connection area. By virtue of the cooperation between the profile 14 and the counter-profile 15, the joint housing 3 is secured against any unwanted displacement in the axial direction of the central longitudinal axis 5 and also against any unwanted rotation about the central longitudinal axis 5. The structure of the end section 12 will be explained in greater detail with reference to the figures that follow.

Figure 3:
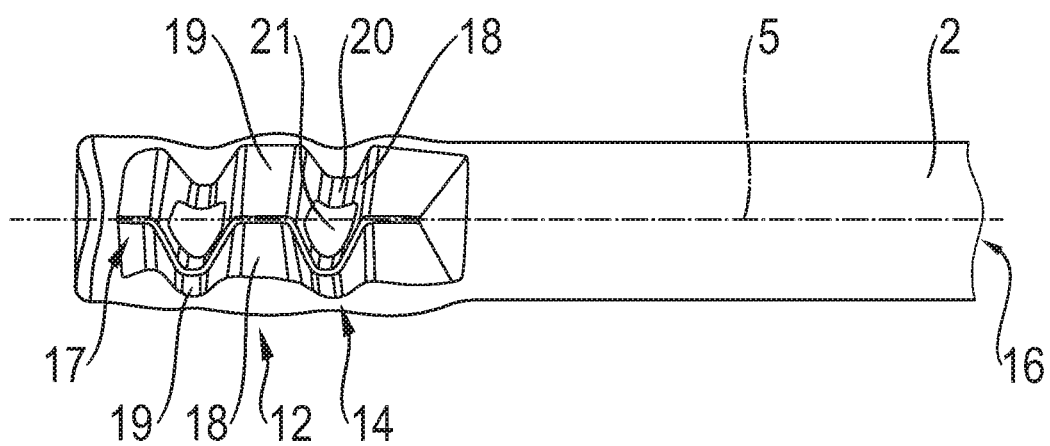

FIG. 3 shows part of a side view of the base body 2 for forming the chassis component 1 according to the invention shown in FIGS. 1 and 2. In FIG. 3, the axially and plastically deformed end section 12 can be seen. Owing to its essentially hollow, or in this case, as an example, tubular structure, the base body 2 has a hollow space 16 (not shown in any greater detail). By virtue of the deformed end section 12 the base body 2 and therefore the hollow space 16 is closed. In this case, owing to the deformed end section 12, the axial end of the base body 2 is closed in such manner that during a subsequent injection-molding and/or casting around the end section 12 with a plastic in order to form the joint housing 3 according to FIG. 1 or 2, the plastic does not penetrate into the hollow space and fill it.

By virtue of the deformation that closes the base body 2, an outside 17 of the end section 12 has a plurality of ridges 18, 20 and depressions 19, 21. The ridges 18, 20 and the depressions 19, 21 are formed at the same time as the plastic deformation of the end section 12 for closing the base body 2. By means of the ridges 18, 20 and the depressions 19, 21, as shown in FIG. 2, the interlock with the plastic of the joint housing 3 is produced. For greater simplicity, not all the ridges 18, 20 and depressions 19, 21 are indexed.

By virtue of the plurality of ridges 18 and depressions 19 that alternate one after another, the deformed end section 12 forms a labyrinth-type seal for the axial sealing of the base body 2. By means of such a labyrinth seal the hollow space 16 of the base body 2 is particularly well sealed or closed against the penetration of plastic during the production of the joint housing 3 according to FIG. 1 or 2.

In this example embodiment, first ridges 18 and first depressions 19 of the end section 12, as viewed in the axial direction of the base body 2, are made in alternation one after another. Furthermore, here a number of rows are formed, each with first ridges 18 and first depressions 19 alternating one after another in the axial direction of the base body 2. The several rows of first ridges 18 and first depressions 19 are arranged or formed distributed around the circumferential direction of the end section 12. In this case the several rows of first ridges 18 and first depressions 19 are orientated in the axial direction of the central longitudinal axis 5 or parallel to the central longitudinal axis 5. In this example embodiment three first ridges 18 and first depressions 19 are formed in each row.

In addition to the first ridges 18 and first depressions 19, in this example embodiment second ridges 20 and second depressions 21 are formed on the end section 12. In this example, in each case one second ridge 20 and one second depression 21 are formed one after another, in this example perpendicularly to the central longitudinal axis 5. In this example embodiment, in each case a second ridge 20 and a second depression 21 are formed as part of a first ridge 18. Thus, the second ridge 20 and the second depression 21 form a head, or head contour of the first ridge 18.

Figure 4:
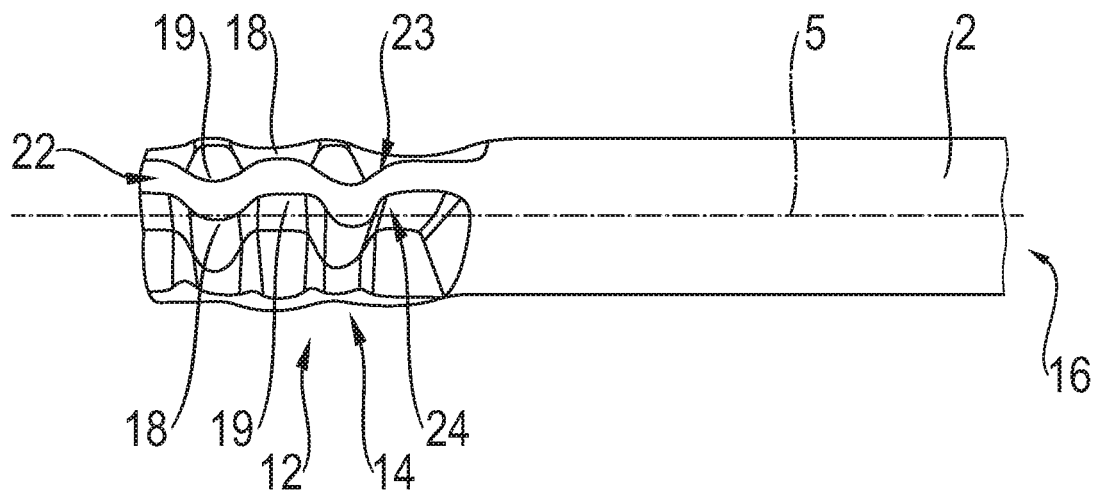

FIG. 4 shows part of another side view of the base body 2 according to FIG. 3. The end section 12 has a number of web-like folds 22, in this example embodiment a total of three. For greater simplicity not all the folds 22 are indexed. The folds 22 are formed uniformly distributed around the circumferential direction of the base body 2 or its end section 12. In this case the folds 22 extend parallel or essentially parallel to the central longitudinal axis 5. Moreover, the folds 22 extend radially or essentially radially relative to the central longitudinal axis 5. Each fold 22 here is in the form of a simple material fold. Thus, each fold is formed of two material layers of the end section 12.

Furthermore, it can be seen here that the ridges 18, 20 and the depressions 19, 21 are formed on outer side sections 23, 24 in each case of an individual fold 22. In this example embodiment, as viewed in the axial direction relative to the central longitudinal axis 5 the position of first ridges 18 on the first outer side section 23 corresponds to the position of first depressions 19 on the second outer side section 24 facing away from the first outer side section 23. Conversely, the position of first depressions 19 on the second outer side section 24 corresponds to the position of first ridges 18 on the first outer side section 23. For greater simplicity, not all the ridges 18, 20 and depressions 19, 21 are indexed.

Figure 5:
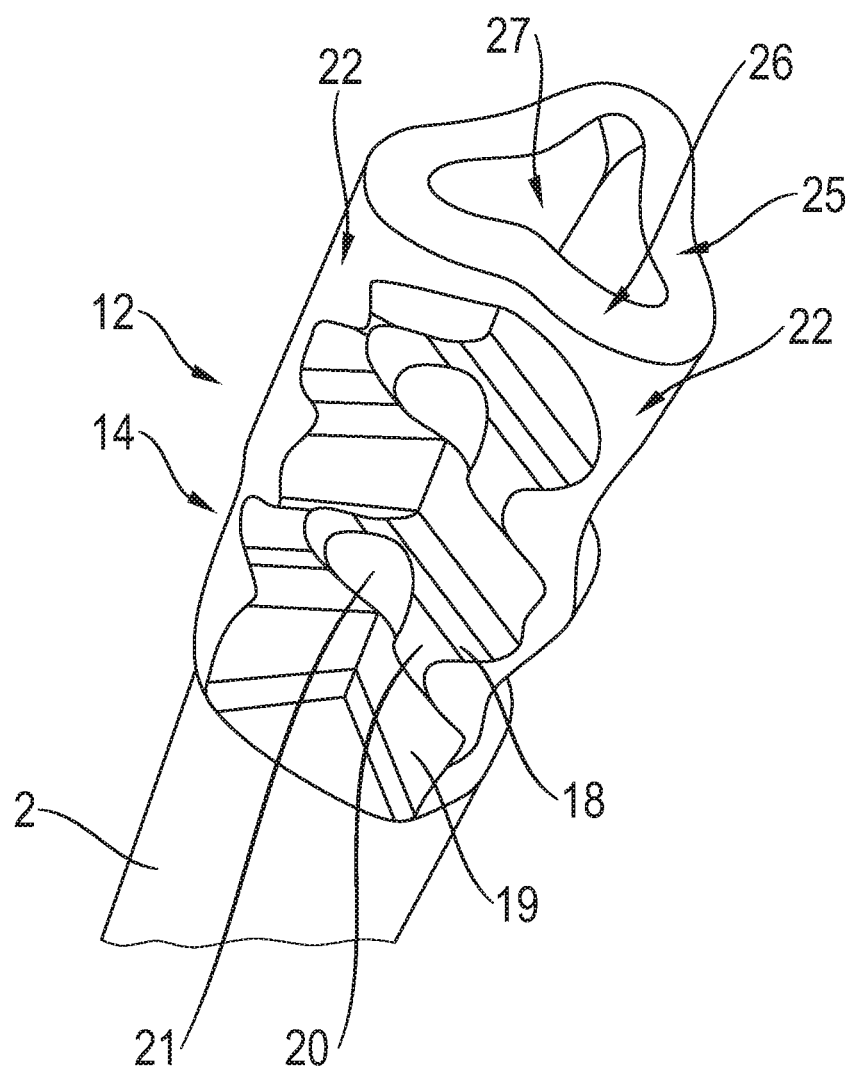

FIG. 5 shows part of a perspective view of the base body 2 according to FIGS. 3 and 4. It can be seen clearly that the web-like folds 22 are formed by virtue of wall sections 25, 26 of the end section 12 pressed at least partially together or against one another. To form the individual fold 22, sections of an inside of the end section 12 or of the wall sections 25, 26 are at least partially pressed into contact with one another.

It can also be seen clearly that in each case a second ridge 20 and a second depression 21 form part of the first ridge 18 and thereby determine the head contour of the first ridge 18. In this example embodiment the second ridge 20 is formed at a radially outer end of the first ridge 18. Starting from the second ridge 20, the second depression is connected radially inward relative thereto.

The end section 12 is formed rotationally symmetrically relative to the central longitudinal axis 5 of the base body 2. Thus, the end section 12 or the base body 2 can be mapped onto itself for rotations about the central longitudinal axis 5 with a specified rotation angle or rotation angles. In this example embodiment the rotational symmetry of the end section 12 is set for a rotation angle of 120° in each case.

Figure 6:
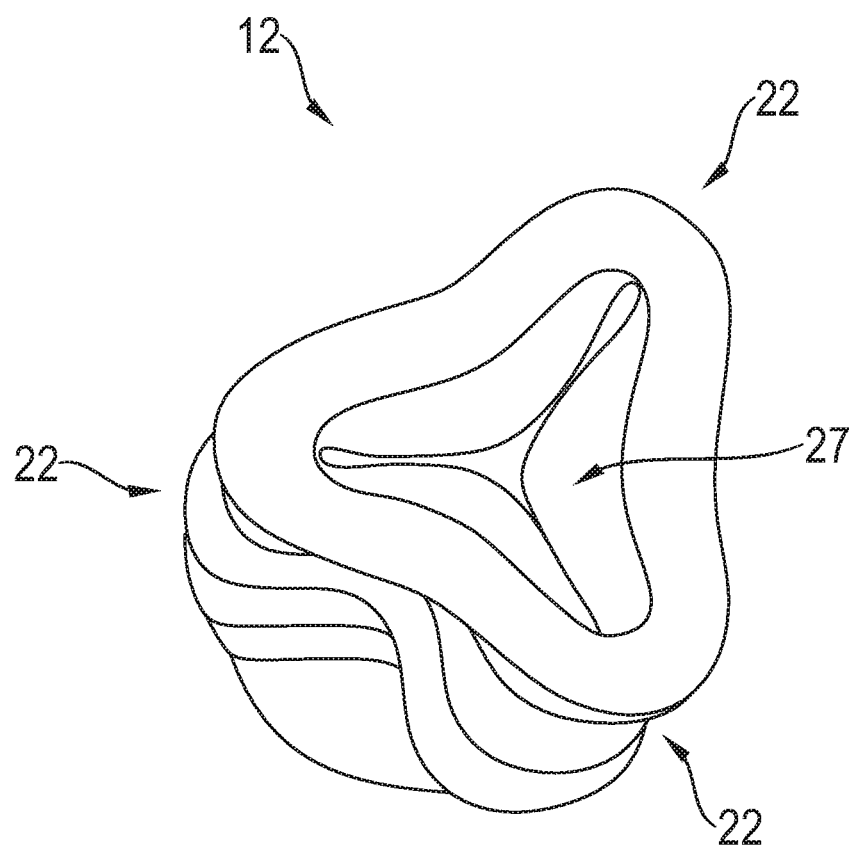

FIG. 6 shows a front view of the base body according to FIGS. 3 to 5. The rotationally symmetrical structure of the end section 12 and the orientation of the three folds 22 in this example embodiment can be seen clearly. Owing to the plastic deformation of the end section 12, it is at the same time sealed.

In FIGS. 5 and 6 it can be seen clearly that in this example embodiment the deformed end section 12 has at its end an inward-directed hollow 27. The hollow 27 is directed axially inward relative to the central longitudinal axis 5. In this case the hollow 27 is pot-shaped. In addition, the hollow 27 is directed radially inward for the sealing closure of the base body 2. The radially inwardly closed hollow 27 is formed by virtue of the deformation of the end section 12. In the chassis component according to FIGS. 1 and 2 the hollow is filled with the plastic that forms the joint housing 3. The interlock between the end section 12 and the plastic of the joint housing 3 is improved by the hollow 27.

In an alternative version not shown here, for the sealing closure of the base body 2 the deformed end section 12 can have or can form a closed front face at its end. This closed front face prevents the penetration of plastic during the formation of the joint housing 3.

Figure 7:
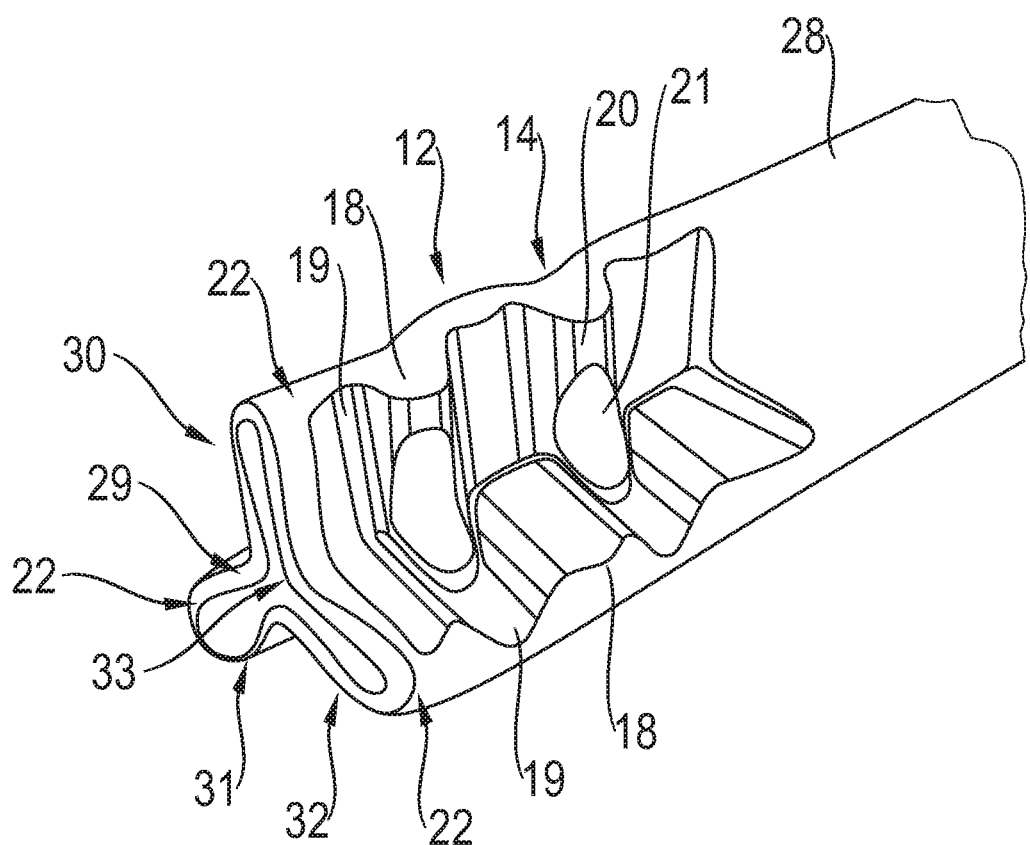

FIG. 7 shows part of a perspective view of a further base body 28 for a chassis component 1 (no more of which is shown here). The structure and functional mode of the base body 28 correspond largely to those of the base body 2 in FIGS. 1 to 6. The same features are denoted by the same indexes as before. Accordingly, reference should also be made to the previous description.

Other than in the base body 2 according to FIGS. 2 to 6, the base body 28 shown in this case has no inward-directed hollow 27 at its end. Instead, the base body 28 forms at its end a closed or essentially closed front face 29 for the sealing closure of the base body 28. This front face 29 prevents the penetration of plastic during the formation of the joint housing 3 or 4. In this example embodiment the front face 29 is not flat. Furthermore, in this example the front face 29 is cross-shaped. In this example the cross-shaped front face 29 forms three limbs 30, 31, 32.

The front face 29 can be regarded as closed provided that during the injection-molding and/or casting with plastic to produce the joint housing 3 or 4, no plastic penetrates into the inside or hollow space 16 of the base body 28. In this connection the front face 29 can also be regarded as closed if a narrow gap 33 remains, so long as the plastic does not enter completely through the gap 33 and therefore does not get into the hollow space 16 of the base body 28.

To produce the chassis component 1 according to FIG. 1, first of all the two axial end sections 12 of the metallic base body 2 or 28 remote from one another are deformed in order to close the base body 2 or 28. During the deformation of the end sections 12, at the same time the several ridges 18, 20 and depressions 19, 21 on the outside 17 of the end section 12 concerned are formed.

To deform the end sections 12, a pressing tool (not shown here) is used, by means of which each end section 12 is at least partially pressed inward or folded radially relative to the central longitudinal axis 5. In this example embodiment, for its deformation the end section 12 is pressed or folded inward from the outside in three different directions, radially relative to the central longitudinal axis 5.

Thereafter, in each case a joint housing 3 made of plastic is injection-molded and/or cast onto the deformed end sections 12 of the base body 2 or 28. During this injection-molding and/or casting onto the end section 12 concerned, an interlock is produced between the plastic of the joint housing 3 and the end section 12 or its profile 14.

INDEXES

1 Chassis component
2 Base body
3 Joint housing
4 Joint housing
5 Central longitudinal axis
6 Joint component
7 Joint ball
8 Joint pin
9 Housing aperture
10 Housing recess
11 Bearing shell
12 End section
13 Connection area
14 Profiling
15 Counter-profile
16 Hollow space
17 Outer side
18 (First) ridge
19 (First) depression
20 (Second) ridge
21 (Second) depression
22 Fold
23 (First) outer side section
24 (Second) outer side section
25 Wall section
26 Wall section
27 Hollow
28 Base body
29 Front face
30 Limb
31 Limb
32 Limb
33 Gap

The invention claimed is:

1. A chassis component for a vehicle, the chassis component comprising:
   a hollow base body made of metal and extending along a central longitudinal axis, wherein at least one axial end section of the base body is a deformed end section configured to seal the base body; and
   at least one joint housing made of plastic, wherein the at least one joint housing is injection-molded or cast onto the deformed end section of the base body, wherein an outer side of the deformed end section has a plurality of ridges and a plurality of depressions configured to form an interlock with the plastic of the at least one joint housing;
   wherein the deformed end section has a plurality of folds distributed circumferentially around the base body and which extend parallel with and/or radially to the central longitudinal axis, wherein individual folds are formed by wall sections of the end section pressed together.

2. The chassis component according to claim 1, wherein the plurality of ridges and the plurality of depressions on the deformed end section define a labyrinth-type seal, wherein the deformed end section and/or the labyrinth-type seal is configured to seal a hollow space of the hollow base body to prevent the penetration of plastic during the production of the joint housing.

3. The chassis component according to claim 1, wherein the plurality of ridges includes first ridges and the plurality of depressions includes first depressions, the first ridges alternate with the first depressions to define a plurality of rows in an axial direction of the base body and distributed circumferentially around the end section, wherein the axial direction is coincident with or parallel to the central longitudinal axis.

4. The chassis component according to claim 3, wherein the plurality of ridges includes at least one second ridge and the plurality of depressions includes at least one second depression, the at least one second ridge and the at least one second depression alternating in a direction transversely the central longitudinal axis of the base body, and wherein the at least one second ridge and the at least one second depression are formed as part of a first ridge and/or a first depression.

5. The chassis component according to claim 1, wherein the deformed end section is rotationally symmetrical relative to the central longitudinal axis.

6. The chassis component according to claim 5, wherein a rotational symmetry of the deformed end section relative to a rotation about the central longitudinal axis corresponds to a rotation angle smaller than 180°.

7. The chassis component according to claim 6, wherein the rotational symmetry of the end section corresponds to a rotation angle of 90° or less.

8. The chassis component according to claim 1, wherein the folds are formed by material of the end section pressed together and/or against one another, and wherein sections of an inner side of the end section contact one another to form the folds.

9. The chassis component according to claim 8, wherein each of the ridges and the depressions are formed on outer side sections of one of the folds facing away from one another one of the folds as viewed in the axial direction relative to the central longitudinal axis, and wherein first ridges are positioned on a first outer side section of the folds and first depressions are positioned on a second outer side section of the folds facing away from the first outer side section.

10. The chassis component according to claim 1, wherein the deformed end section forms at its end a closed front face or the deformed end section has at its end a hollow directed axially inward relative to the central longitudinal axis.

11. The chassis component according to claim 10, wherein the hollow of the deformed end section is pot-shaped.

12. The chassis component according to claim 10, wherein the hollow of the deformed end section is filled by the plastic used to produce the joint housing.

13. The chassis component according to claim 1, wherein two axial end sections of the base body remote from one another are deformed in order to seal the base body, and on each of the two axial end sections a joint housing made of plastic is formed by injection-molding and/or casting, and wherein a joint component is fitted into the joint housings.

14. The chassis component according to claim 13, wherein the chassis component is in the form of a chassis linkage or a two-point control arm or a pendulum support.

15. A method for producing a chassis component according to claim 1, the method comprising:
   deforming the axial end section of the metallic hollow base body to seal the base body;

forming the at least one joint housing of plastic by injection molding or casting onto the deformed end section of the base body; and forming, during the deforming step, ridges and depressions in the outside of the end section, wherein when the plastic is injection-molded or cast onto the end section to produce the joint housing an interlock is produced between the plastic of the joint housing and the ridges and depressions.

16. The method according to claim 15, wherein in order to seal the base body, the end section is at least partially pressed and/or folded from the outside inward radially relative to the central longitudinal axis, by means of a pressing tool, wherein the end section is deformed and/or folded from the outside inward radially relative to the central longitudinal axis in at least three different directions.

17. The chassis component according to claim 1, wherein individual folds are formed by wall sections of the deformed end section, and wherein inner sides of the deformed end section are pressed against one another.

\* \* \* \* \*